(12) United States Patent
Syu et al.

(10) Patent No.: US 11,243,345 B2
(45) Date of Patent: Feb. 8, 2022

(54) LIGHT SOURCE ASSEMBLY AND DISPLAY DEVICE

(71) Applicant: QISDA CORPORATION, Taoyuan (TW)

(72) Inventors: Jyun-Sheng Syu, Taoyuan (TW); Chung-Yu Kuo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/037,715

(22) Filed: Sep. 30, 2020

(65) Prior Publication Data
US 2021/0349254 A1    Nov. 11, 2021

(30) Foreign Application Priority Data

May 11, 2020 (TW) .................................. 109115510

(51) Int. Cl.
*F21V 8/00* (2006.01)
(52) U.S. Cl.
CPC ......... *G02B 6/0088* (2013.01); *G02B 6/0021* (2013.01)
(58) Field of Classification Search
CPC .. G02B 6/0088; G02B 6/0021; G02B 6/0023; G02B 6/009
See application file for complete search history.

(56) References Cited

U.S. PATENT DOCUMENTS

| 2002/0141181 A1* | 10/2002 | Bailey | ...................... F21S 2/00 |
| | | | 362/150 |
| 2011/0058124 A1* | 3/2011 | Chien | .................. G02B 6/0078 |
| | | | 349/64 |
| 2017/0363910 A1* | 12/2017 | Fukuda | ............. G02F 1/133605 |

FOREIGN PATENT DOCUMENTS

TW          201348634 A    12/2013

* cited by examiner

*Primary Examiner* — Anabel Ton

(57) ABSTRACT

A light source assembly includes a plurality of light source modules. Each of the light source modules includes a base, a light emitting unit and a light guide member. The light guide member has an accommodating space. The light emitting unit and the light guide member are disposed on the base and the light emitting unit is located in the accommodating space. At least one of the base and the light guide member has a first connecting structure and a second connecting structure. The first connecting structure of one of the light source modules is connected to the second connecting structure of another one of the light source modules, such that the light source modules are connected to each other to form the light source assembly.

20 Claims, 12 Drawing Sheets

LIGHT SOURCE ASSEMBLY AND DISPLAY DEVICE

BACKGROUND OF THE INVENTION

1. Field of the Invention

The invention relates to a light source assembly and a display device and, more particularly, to a light source assembly capable of reducing an optical distance effectively and a display device equipped with the light source assembly.

2. Description of the Prior Art

Since a liquid crystal display (LCD) has advantages of thin thickness, light weight, low power consumption, no radiation pollution, and being compatible with semiconductor process, it has been applied in various electronic devices including notebook, mobile phone, digital still camera, personal digital assistant, and so on. The LCD utilizes a backlight module to provide light for a display panel, so as to display images. At present, the backlight module comprises a direct type backlight module and an edge type backlight module. Since a light source of the direct type backlight module is distributed uniformly behind a display panel, the direct type backlight module may obtain more uniform image. In order to mix light, a specific distance has to be kept between the light source of the direct type backlight module and optical films, wherein the distance is an optical distance. In general, the optical distance is usually between 15 mm and 35 mm, such that the whole thickness of the display device equipped with the direct type backlight module cannot be reduced. Thus, it is not beneficial to thin the display device.

SUMMARY OF THE INVENTION

The invention provides a light source assembly capable of reducing an optical distance effectively and a display device equipped with the light source assembly, so as to solve the aforesaid problems.

According to an embodiment of the invention, a light source assembly comprises a plurality of light source modules. Each of the light source modules comprises a base, a light emitting unit and a light guide member. The light guide member has an accommodating space. The light emitting unit and the light guide member are disposed on the base and the light emitting unit is located in the accommodating space. At least one of the base and the light guide member has a first connecting structure and a second connecting structure. The first connecting structure of one of the light source modules is connected to the second connecting structure of another one of the light source modules, such that the light source modules are connected to each other to form the light source assembly.

According to an embodiment of the invention, a display device comprises a plate, a light source and a display panel. The light source assembly is disposed on the plate. The light source assembly comprises a plurality of light source modules. Each of the light source modules comprises a base, a light emitting unit and a light guide member. The light guide member has an accommodating space. The light emitting unit and the light guide member are disposed on the base and the light emitting unit is located in the accommodating space. At least one of the base and the light guide member has a first connecting structure and a second connecting structure. The first connecting structure of one of the light source modules is connected to the second connecting structure of another one of the light source modules, such that the light source modules are connected to each other to form the light source assembly. The display panel is disposed on the light source assembly.

As mentioned in the above, the light source module essentially consists of the base, the light emitting unit and the light guide member and the light source module has the connecting structures configured to connect other light source modules. Accordingly, the invention can connect a plurality of light source modules with each other to form a planar light source assembly. Since the light guide member of the light source module can diffuse point light source into surface light source within a short distance, the invention can reduce the optical distance effectively. When the light source assembly of the invention is served as a direct type backlight module, it is beneficial to thin the display device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is an exploded view illustrating the light source module shown in FIG. 1.

FIG. 3 is a sectional view illustrating the light source assembly shown in FIG. 1.

DETAILED DESCRIPTION

Figure 1:
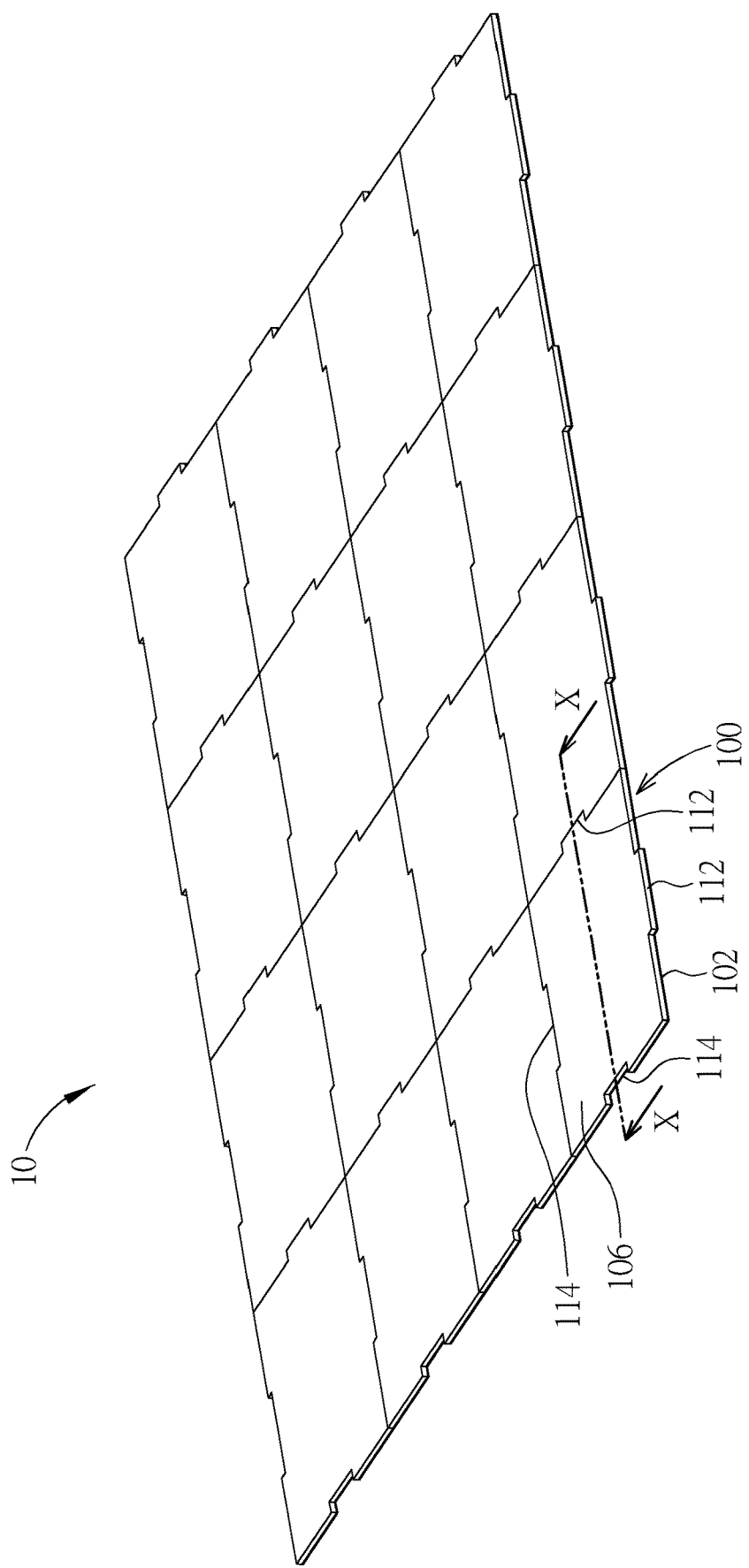
FIGS. 1 to 3, FIG. 1 is a perspective view illustrating alight source assembly according to an embodiment of the invention.
Figure 2:
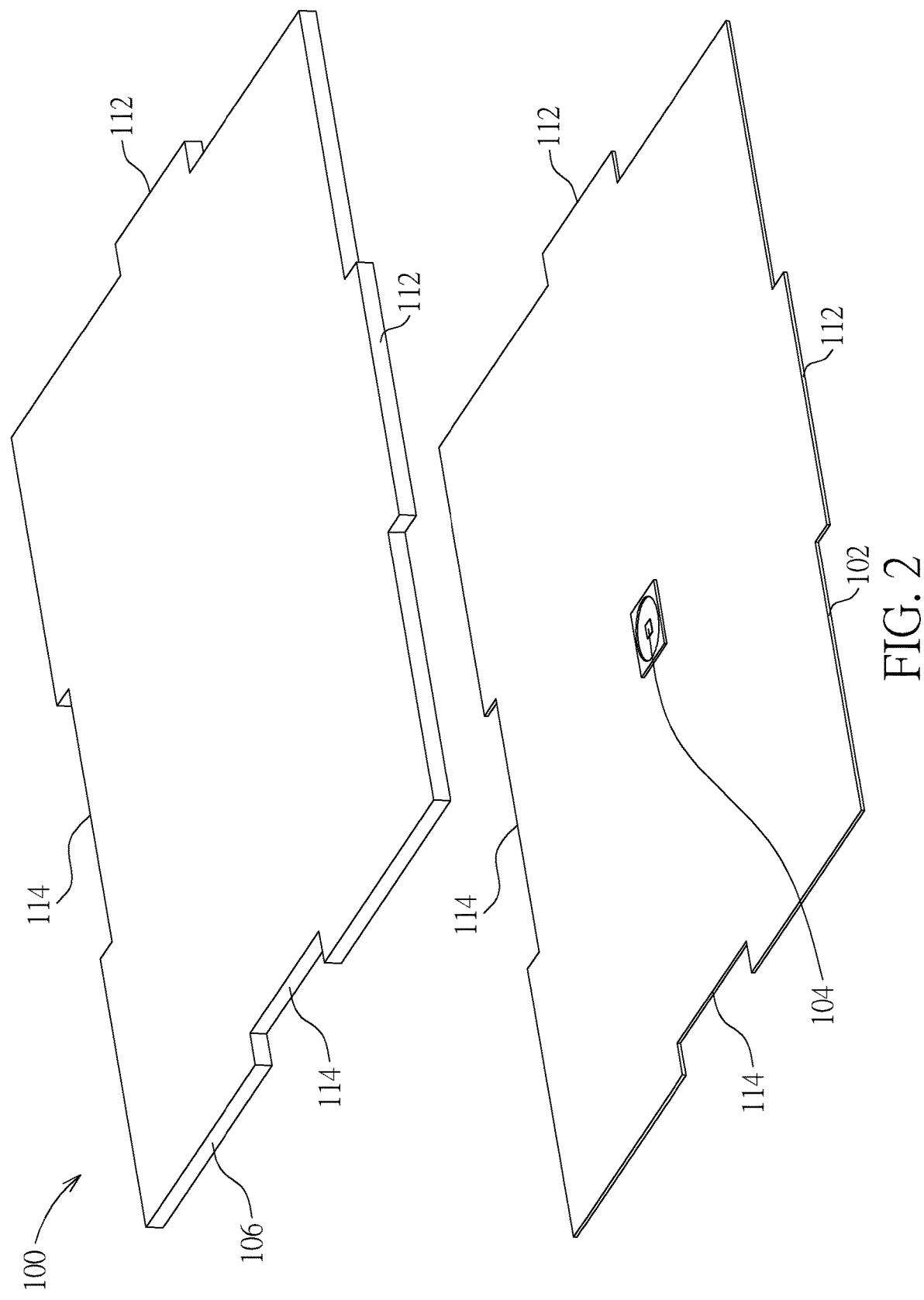
Figure 3:
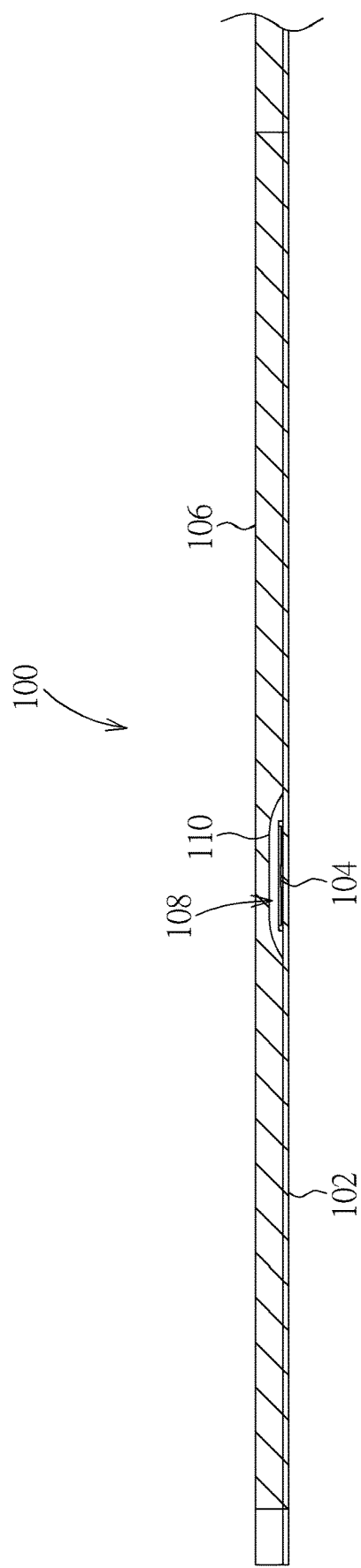

Referring to FIGS. 1 to 3, FIG. 1 is a perspective view illustrating a light source assembly 10 according to an embodiment of the invention, FIG. 2 is an exploded view illustrating the light source module 100 shown in FIG. 1, and FIG. 3 is a sectional view illustrating the light source assembly 10 along line X-X shown in FIG. 1.

As shown in FIGS. 1 to 3, the light source assembly 10 comprises a plurality of light source modules 100, wherein each of the light source modules 100 comprising a base 102, a light emitting unit 104 and a light guide member 106. In this embodiment, the base 102 may be a circuit board, the light emitting unit 104 may be a light emitting diode, and the light guide member 106 may be a light guide plate. The light guide member 106 has an accommodating space 108. The light emitting unit 104 and the light guide member 106 are disposed on the base 102 and the light emitting unit 104 is located in the accommodating space 108, as shown in FIG. 3. In this embodiment, an inner surface 110 of the accommodating space 108 may be curved, but is not so limited. In another embodiment, the inner surface 110 of the accommodating space 108 may also be taper or rectangular. It should be noted that the shape of the inner surface 110 of the accommodating space 108 may be determined according to practical light emitting requirement.

At least one of the base 102 and the light guide member 106 has a first connecting structure 112 and a second connecting structure 114. Accordingly, the first connecting structure 112 of one of the light source modules 100 can be connected to the second connecting structure 114 of another one of the light source modules 100, such that the light source modules 100 are connected to each other to form the light source assembly 10.

In this embodiment, the base 102 may have two first connecting structures 112 and two second connecting structures 114, and the light guide member 106 may also have two first connecting structures 112 and two second connecting structures 114, wherein the positions of the first connecting structures 112 and the second connecting structures 114 of the base 102 correspond to the positions of the first connecting structures 112 and the second connecting structures 114 of the light guide member 106, as shown in FIG. 2. In this embodiment, the first connecting structure 112 may be a concave-convex structure and the second connecting structure 114 may be another concave-convex structure corresponding to the first connecting structure 112. The aforesaid concave-convex structure may be sawtooth-shaped, block-shaped or other shapes according to practical applications. Therefore, the invention can connect a plurality of light source modules 100 with each other by the first connecting structures 112 and the second connecting structures 114 to form a planar light source assembly 10 according to practical light emitting requirement.

Figure 4:
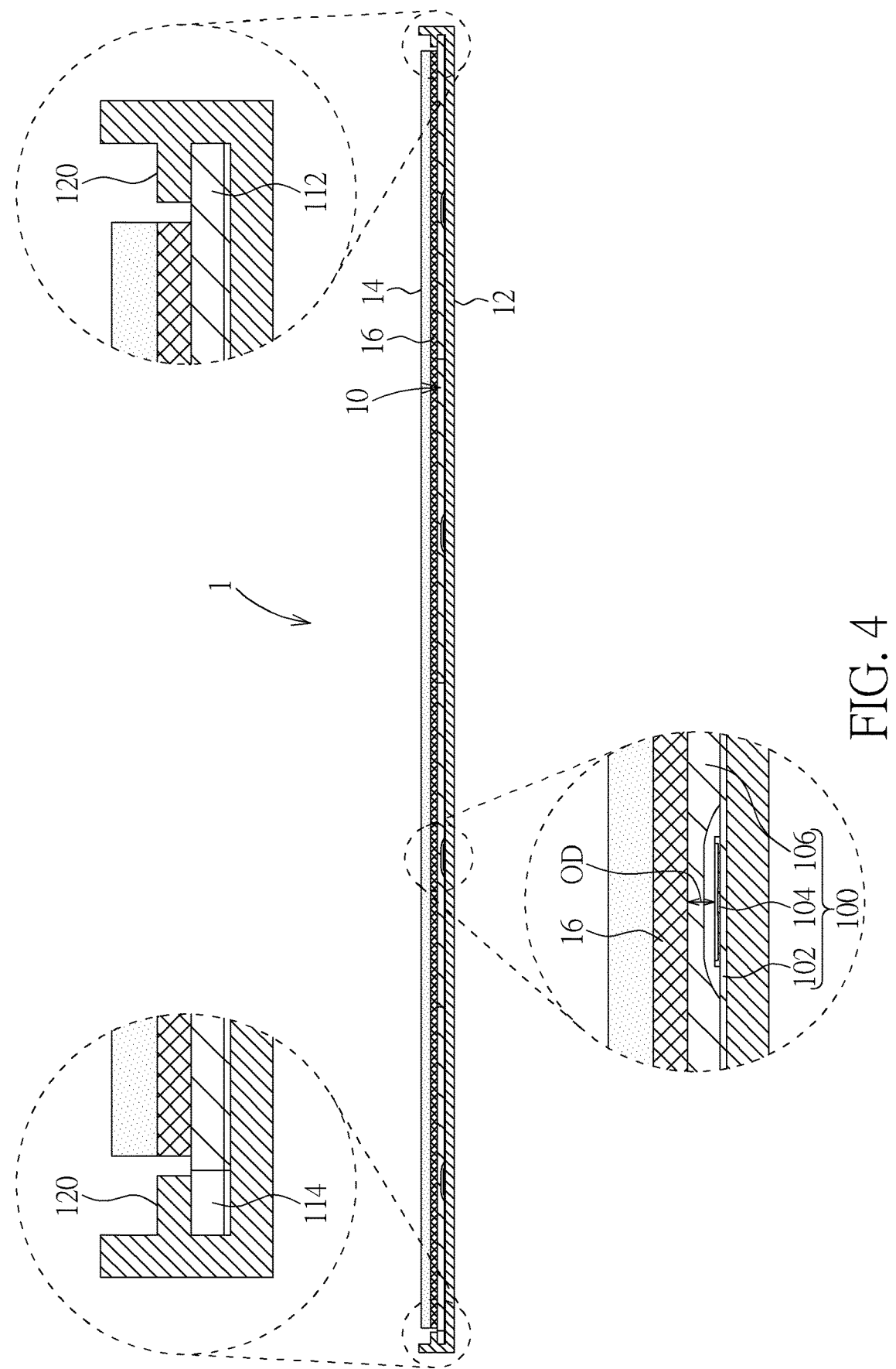
FIG. 4 is a sectional view illustrating a display device equipped with the light source assembly according to another embodiment of the invention.

Referring to FIG. 4, FIG. 4 is a sectional view illustrating a display device 1 equipped with the light source assembly 10 according to another embodiment of the invention. As shown in FIG. 4, the display device 1 comprises the aforesaid light source assembly 10, a plate 12, a display panel 14 and an optical film 16. The light source assembly 10 is disposed on the plate 12. In this embodiment, opposite sides of the plate 12 may have two positioning structures 120, wherein the positioning structure 120 may be a sliding groove. Accordingly, the first connecting structure 112 and the second connecting structure 114 at opposite sides of the light source assembly 10 may be slidably connected to the two positioning structures 120, respectively, such that the light source assembly 10 is positioned on the plate 12. In another embodiment, the light source assembly 10 may also be attached on the plate 12 by a double-sided tape. At this time, the aforesaid positioning structures 120 may be omitted.

The display panel 14 and the optical film 16 are disposed on the light source assembly 10. A distance between the light emitting diode 104 and the optical film 16 is an optical distance OD. In practical applications, the optical film 16 may be a diffusion plate, a diffusion sheet or other optical films. Since the light guide member 106 of the light source module 100 can diffuse point light source into surface light source within a short distance, the invention can reduce the optical distance OD to be within 5 mm effectively. When the light source assembly 10 of the invention is served as a direct type backlight module, it is beneficial to thin the display device 1.

Figure 5:
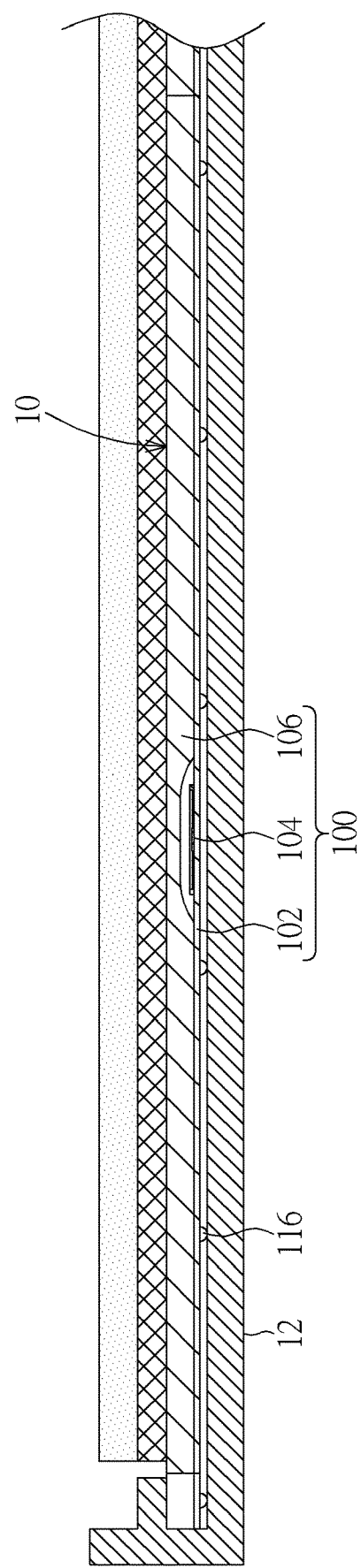
FIG. 5 is a partial sectional view illustrating the base with protrusions according to another embodiment of the invention.
Figure 6:
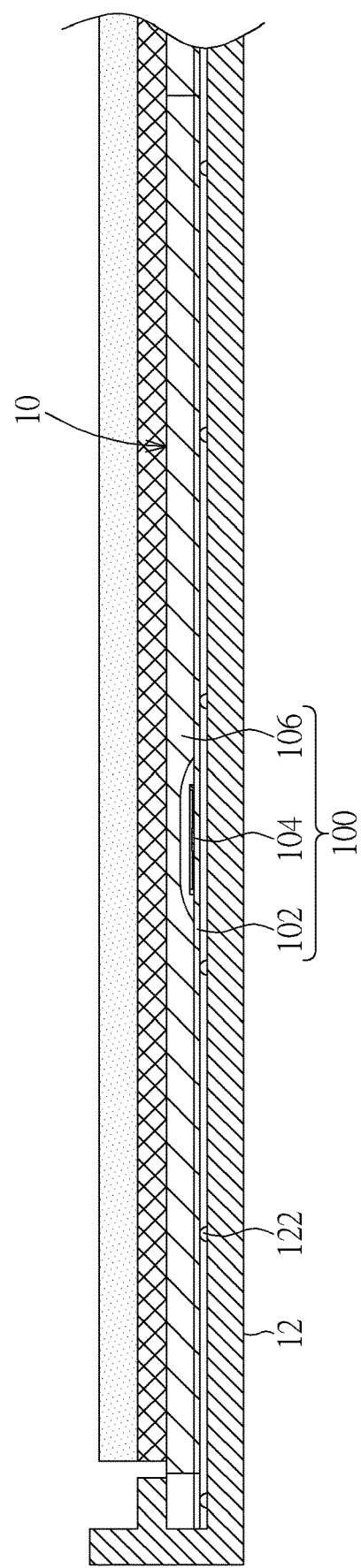
FIG. 6 is a partial sectional view illustrating the plate with protrusions according to another embodiment of the invention.

Referring to FIGS. 5 and 6, FIG. 5 is a partial sectional view illustrating the base 102 with protrusions 116 according to another embodiment of the invention and FIG. 6 is a partial sectional view illustrating the plate 12 with protrusions 122 according to another embodiment of the invention. In another embodiment, one of the base 102 and the plate 12 may have at least one protrusion. Accordingly, when the light source assembly 10 is disposed on the plate 12, the at least one protrusion abuts against another one of the base 102 and the plate 12, such that the light source assembly 10 is disposed on the plate 12 more stably. As shown in FIG. 5, the base 102 may have a plurality of protrusions 116. Thus, when the light source assembly 10 is disposed on the plate 12, the protrusions 116 abut against the plate 12. As shown in FIG. 6, the plate 12 has a plurality of protrusions 122. Thus, when the light source assembly 10 is disposed on the plate 12, the protrusions 112 abut against the base 102.

Figure 7:
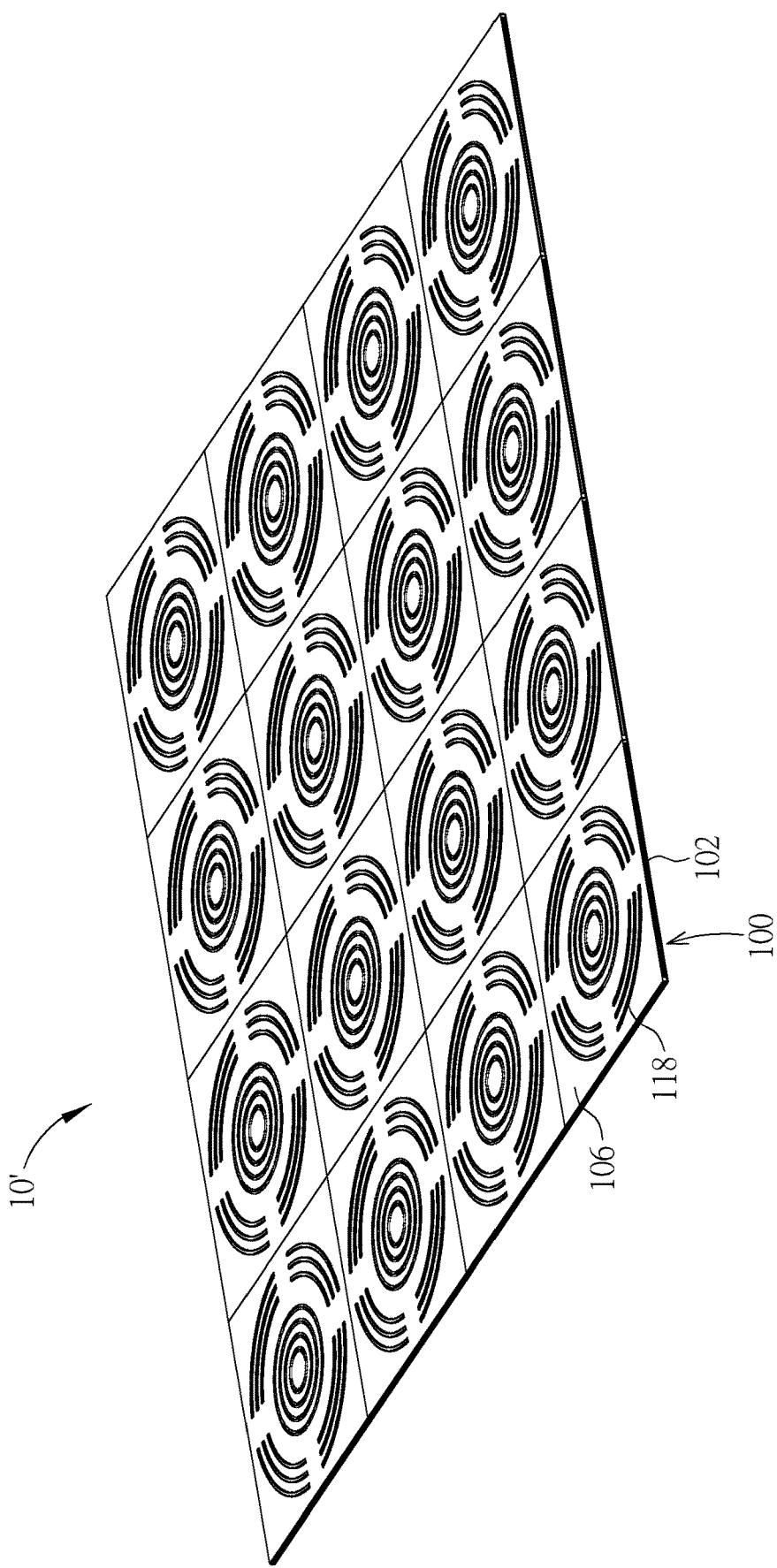
FIG. 7 is a perspective view illustrating a light source assembly according to another embodiment of the invention.
Figure 8:
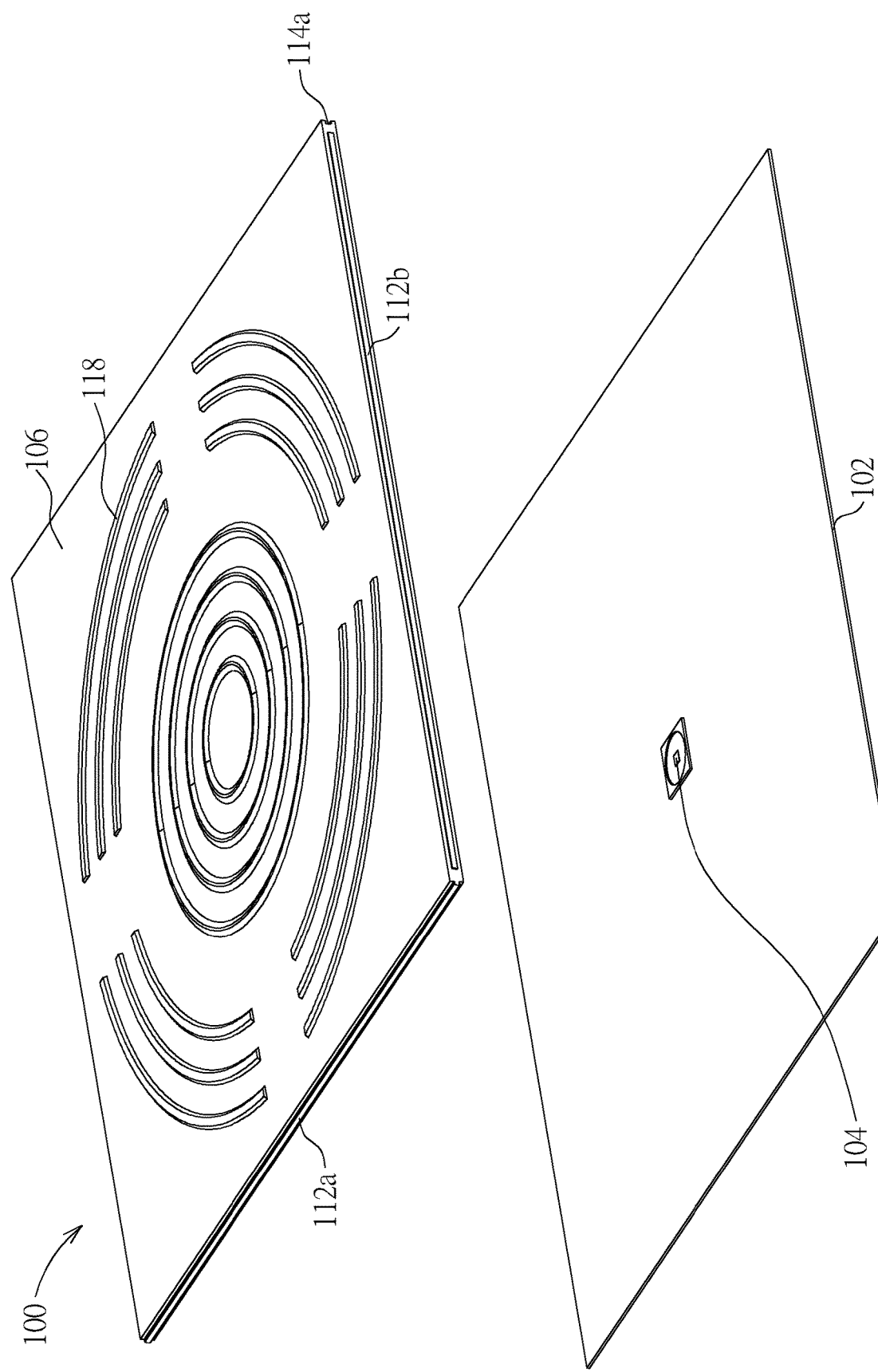
FIG. 8 is an exploded view illustrating the light source module shown in FIG. 7.
Figure 9:
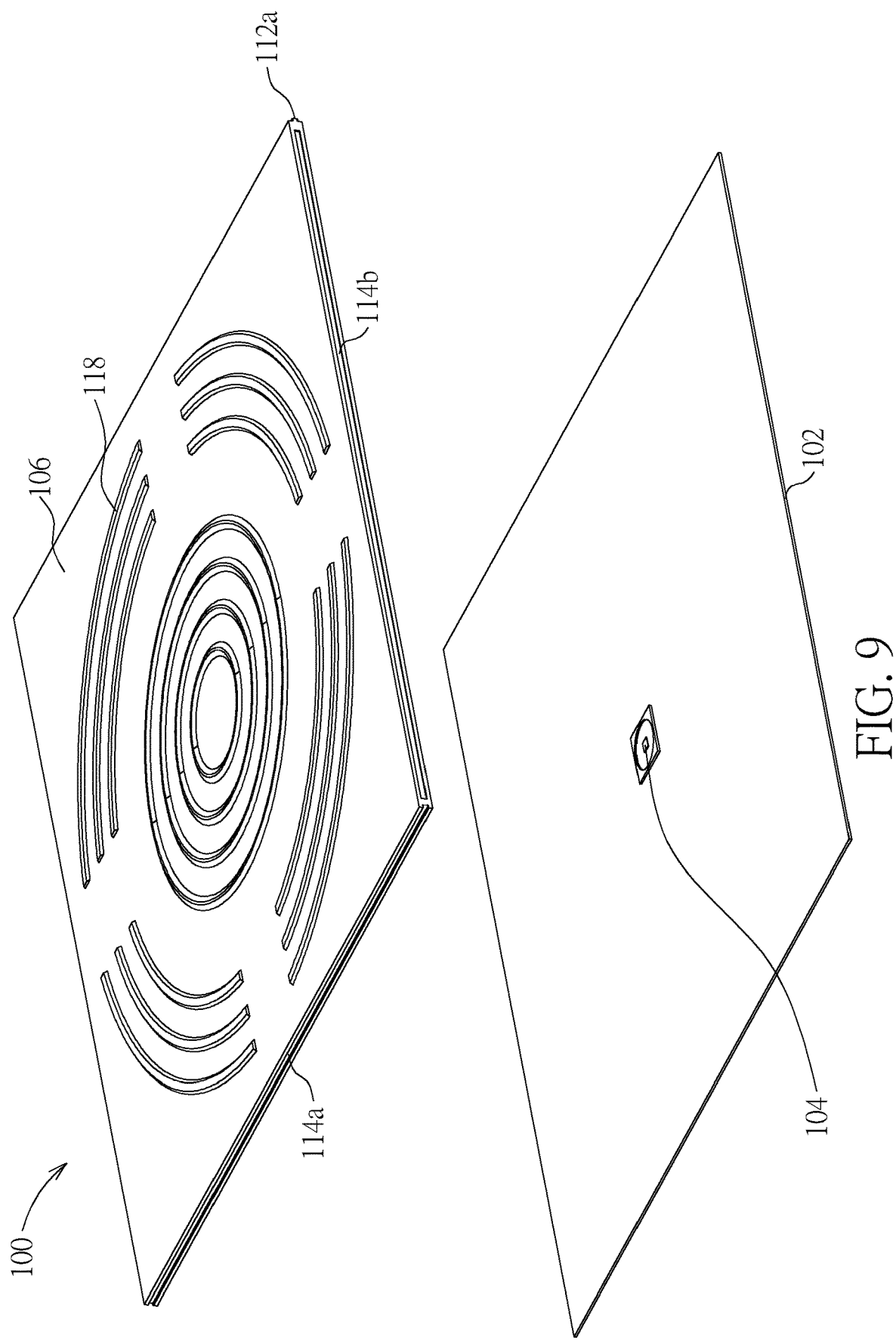
FIG. 9 is an exploded view illustrating the light source module shown in FIG. 7 from another viewing angle.

Referring to FIGS. 7 to 9, FIG. 7 is a perspective view illustrating a light source assembly 10' according to another embodiment of the invention, FIG. 8 is an exploded view illustrating the light source module 100 shown in FIG. 7, and FIG. 9 is an exploded view illustrating the light source module 100 shown in FIG. 7 from another viewing angle.

The main difference between the light source assembly 10' and the aforesaid light source assembly 10 is that an outer surface of the light guide member 106 of the light source assembly 10' may have a non-planar structure 118, as shown in FIGS. 7 to 9. In this embodiment, the non-planar structure 118 may be curved, but is not so limited. In another embodiment, the non-planar structure 118 may also be taper or rectangular. It should be noted that the shape of the non-planar structure 118 may be designed according to practical light emitting requirement.

Furthermore, the light guide member 106 of the light source assembly 10' may have two first connecting structures 112a, 112b with different types and two second connecting structures 114a, 114b with different types. In this embodiment, one of the first connecting structure 112a and the second connecting structure 114a may be a sliding groove and another one of the first connecting structure 112a and the second connecting structure 114a may be a sliding rail. As shown in FIGS. 8 and 9, the first connecting structure 112a may be a sliding groove and the second connecting structure 114a may be a sliding rail, such that the first connecting structure 112a and the second connecting structure 114a may be slidably connected to each other. Still further, one of the first connecting structure 112b and the second connecting structure 114b may be a magnet and another one of the first connecting structure 112b and the second connecting structure 114b may be a magnet or a magnetic induction material (e.g. iron). As shown in FIGS. 8 and 9, the first connecting structure 112b may be a magnet and the second connecting structure 114b may be a magnetic induction material, such that the first connecting structure 112b and the second connecting structure 114b may be connected to each other by a magnetic attraction force. Accordingly, the invention can connect a plurality of light source modules 100 with each other by the first connecting structures 112a, 112b and the second connecting structures 114a, 114b to form a planar light source assembly 10' according to practical light emitting requirement. In another embodiment, the invention may only dispose the first connecting structure 112a and the second connecting structure 114a at the periphery of the light guide member 106. In another embodiment, the invention may only dispose the first connecting structure 112b and the second connecting structure 114b at the periphery of the light guide member 106.

Figure 10:
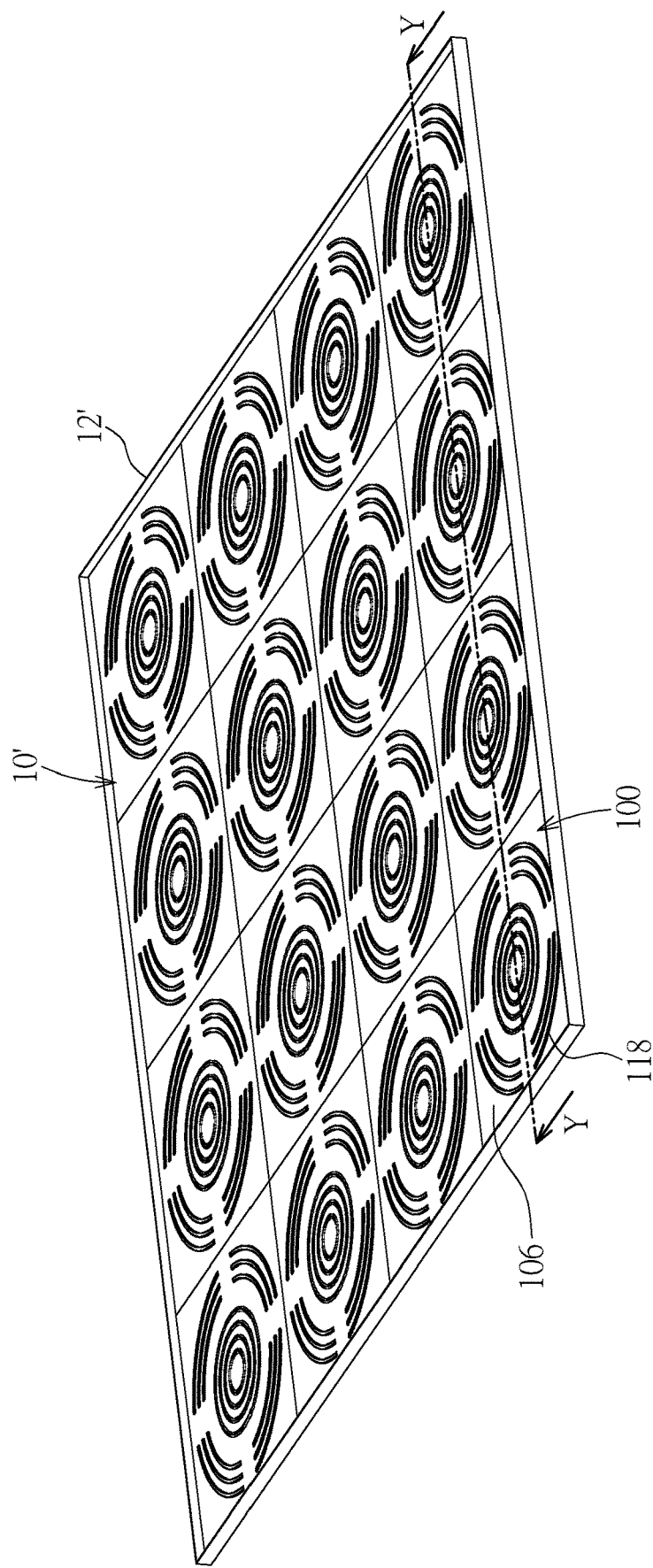
FIG. 10 is a perspective view illustrating the light source assembly shown in FIG. 7 being disposed on a plate.
Figure 11:
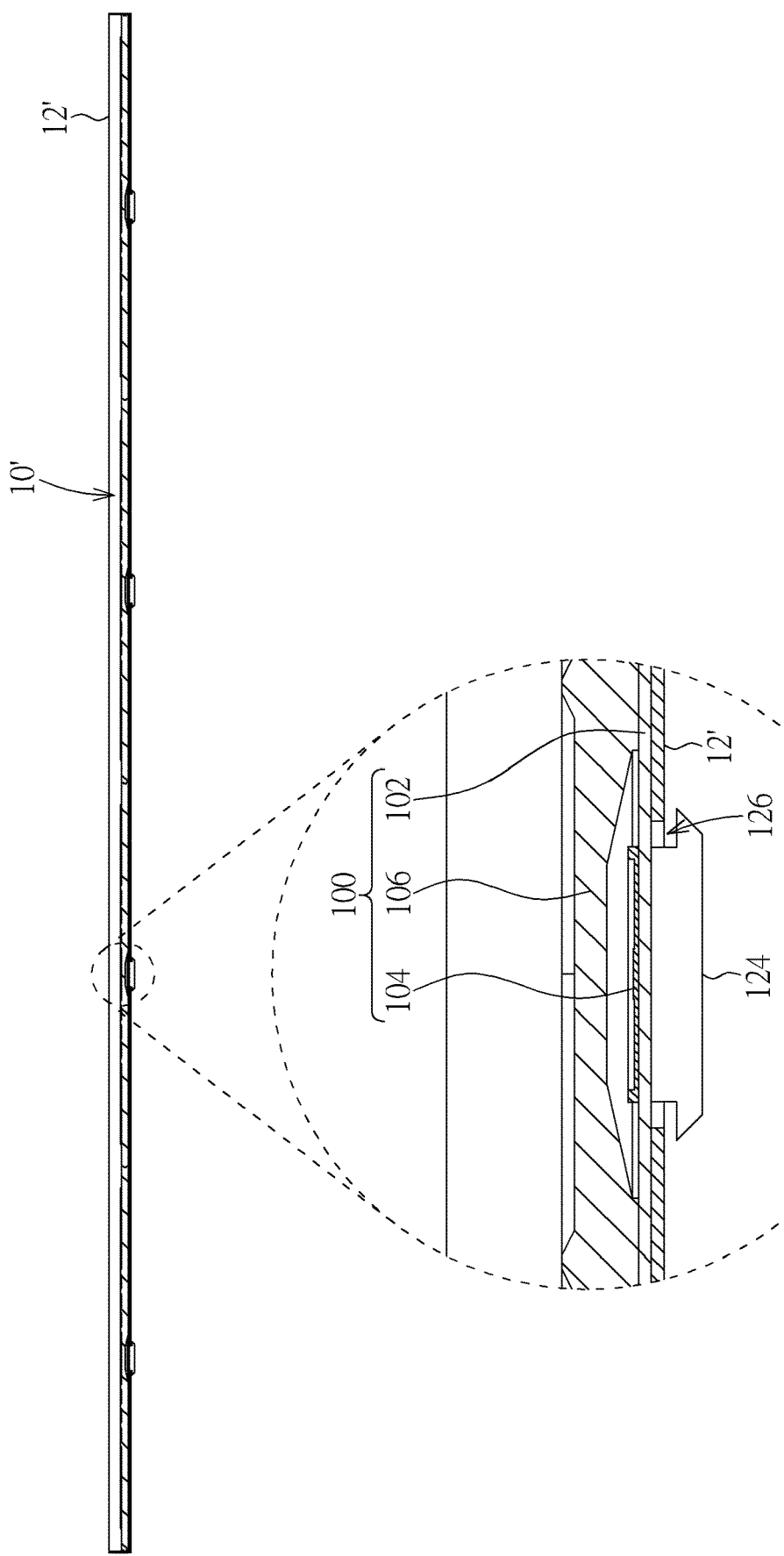
FIG. 11 is a sectional view illustrating the light source assembly and the plate shown in FIG. 10.

Referring to FIGS. 10 and 11, FIG. 10 is a perspective view illustrating the light source assembly 10' shown in FIG. 7 being disposed on a plate 12' and FIG. 11 is a sectional view illustrating the light source assembly 10' and the plate 12' along line Y-Y shown in FIG. 10.

As shown in FIGS. 10 and 11, the light source assembly 10' may be disposed on a plate 12'. In this embodiment, at least one of the base 102 and the light guide member 106 of the light source module 100 may have a first positioning structure. As shown in FIG. 11, the base 102 of the light source module 100 has a first positioning structure 124. Furthermore, the plate 12' may have a plurality of second positioning structures 126. In this embodiment, one of the first positioning structure 124 and the second positioning structure 126 may be an engaging hook and another one of the first positioning structure 124 and the second positioning structure 126 may be an engaging hole. As shown in FIG. 11, the first positioning structure 124 may be an engaging hook and the second positioning structure 126 may be an engaging hole. Accordingly, when the light source assembly 10' is disposed on the plate 12', the first positioning structure 124 may be connected to the second positioning structure 126 by engagement to position the light source assembly 10' on the plate 12'.

Figure 12:
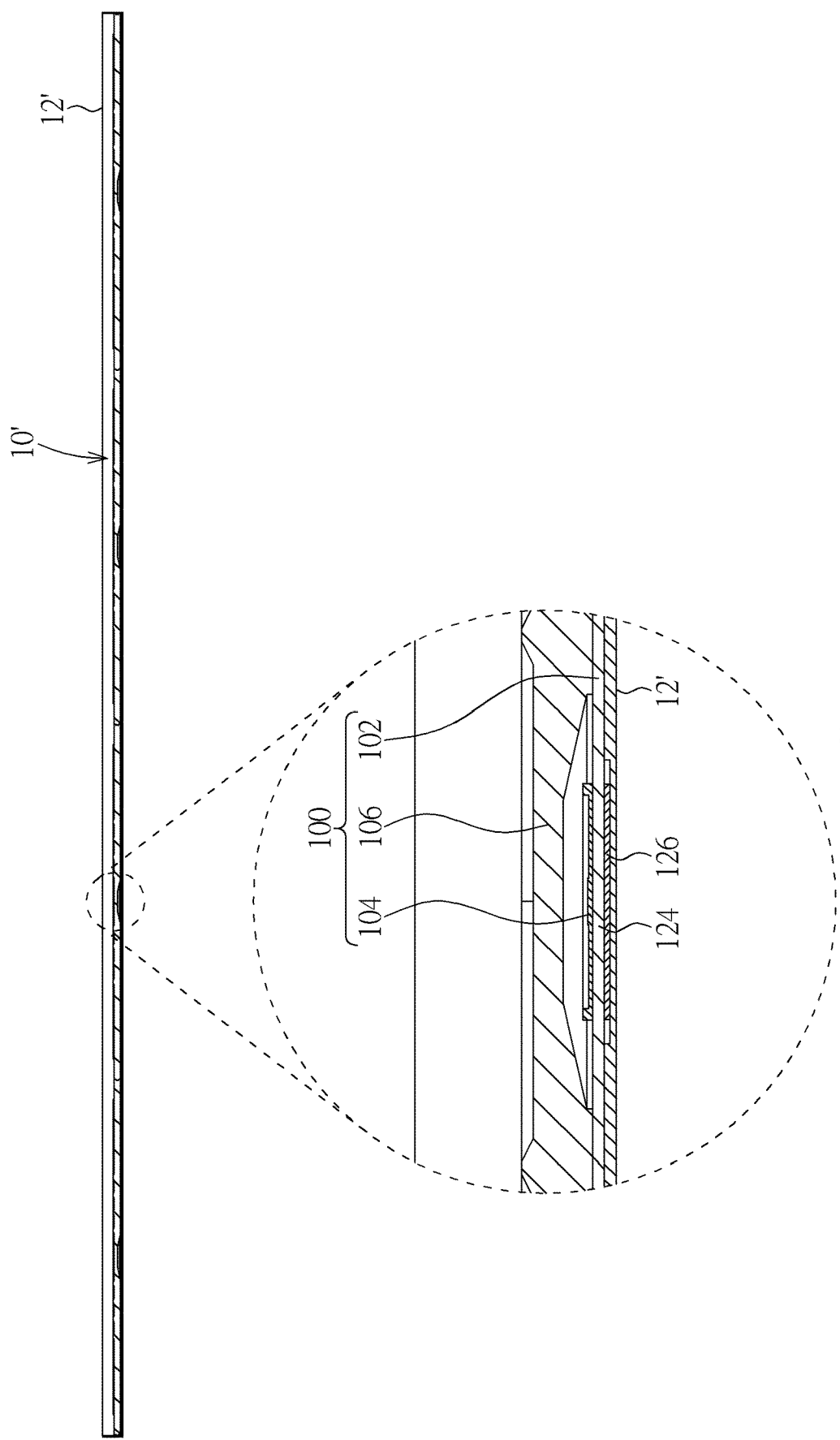
FIG. 12 is a sectional view illustrating the light source assembly and the plate according to another embodiment of the invention.

Referring to FIG. 12, FIG. 12 is a sectional view illustrating the light source assembly 10' and the plate 12' according to another embodiment of the invention. In another embodiment, one of the first positioning structure 124 and the second positioning structure 126 may be a magnet and another one of the first positioning structure 124 and the second positioning structure 126 may be a magnet or a magnetic induction material (e.g. iron). As shown in FIG. 12, the first positioning structure 124 and the second positioning structure 126 may be a magnetic induction material and the second positioning structure 126 may be a magnet. Accordingly, when the light source assembly 10' is disposed on the plate 12', the first positioning structure 124 may be connected to the second positioning structure 126 by a magnetic attraction force to position the light source assembly 10' on the plate 12'.

In another embodiment, the light source assembly 10' may also be attached on the plate 12' by a double-sided tape. At this time, the aforesaid first positioning structure 124 and second positioning structure 126 may be omitted.

As mentioned in the above, the light source module essentially consists of the base, the light emitting unit and the light guide member and the light source module has the connecting structures configured to connect other light source modules. Accordingly, the invention can connect a plurality of light source modules with each other to form a planar light source assembly. Since the light guide member of the light source module can diffuse point light source into surface light source within a short distance, the invention can reduce the optical distance effectively. When the light source assembly of the invention is served as a direct type backlight module, it is beneficial to thin the display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light source assembly comprising:
a plurality of light source modules, each of the light source modules comprising a base, a light emitting unit and a light guide member, the light guide member having an accommodating space, the light emitting unit and the light guide member being disposed on the base, the light emitting unit being located in the accommodating space, the light emitting unit emitting light into the light guide member to make the light guide member diffuse the light into light of a surface light source, at least one of the base and the light guide member having a first connecting structure and a second connecting structure, the first connecting structure of one of the light source modules being connected to the second connecting structure of another one of the light source modules, such that the light source modules are connected to each other to form the light source assembly.

2. The light source assembly of claim 1, wherein the first connecting structure is a concave-convex structure and the second connecting structure is another concave-convex structure corresponding to the first connecting structure.

3. The light source assembly of claim 1, wherein one of the first connecting structure and the second connecting structure is a sliding groove and another one of the first connecting structure and the second connecting structure is a sliding rail.

4. The light source assembly of claim 1, wherein one of the first connecting structure and the second connecting structure is a magnet and another one of the first connecting structure and the second connecting structure is a magnet or a magnetic induction material.

5. The light source assembly of claim 1, disposed on a plate, wherein at least one of the base and the light guide member has a first positioning structure, the plate has a plurality of second positioning structures, and the first positioning structure is connected to the second positioning structure to position the light source assembly on the plate.

6. The light source assembly of claim 5, wherein one of the first positioning structure and the second positioning structure is an engaging hook and another one of the first positioning structure and the second positioning structure is an engaging hole.

7. The light source assembly of claim 5, wherein one of the first positioning structure and the second positioning structure is a magnet and another one of the first positioning structure and the second positioning structure is a magnet or a magnetic induction material.

8. The light source assembly of claim 1, disposed on a plate, wherein opposite sides of the plate have two positioning structures, the first connecting structure and the second connecting structure at opposite sides of the light source assembly are connected to the two positioning structures, respectively, such that the light source assembly is positioned on the plate.

9. The light source assembly of claim 8, wherein the positioning structure is a sliding groove.

10. The light source assembly of claim 1, disposed on a plate, wherein one of the base and the plate has at least one protrusion; when the light source assembly is disposed on the plate, the at least one protrusion abuts against another one of the base and the plate.

11. A display device comprising:
a plate;

a light source assembly disposed on the plate, the light source assembly comprising a plurality of light source modules, each of the light source modules comprising a base, a light emitting unit and a light guide member, the light guide member having an accommodating space, the light emitting unit and the light guide member being disposed on the base, the light emitting unit being located in the accommodating space, at least one of the base and the light guide member having a first connecting structure and a second connecting structure, the first connecting structure of one of the light source modules being connected to the second connecting structure of another one of the light source modules, such that the light source modules are connected to each other to form the light source assembly; and a display panel disposed on the light source assembly.

12. The display device of claim 11, wherein the first connecting structure is a concave-convex structure and the second connecting structure is another concave-convex structure corresponding to the first connecting structure.

13. The display device of claim 11, wherein one of the first connecting structure and the second connecting structure is a sliding groove and another one of the first connecting structure and the second connecting structure is a sliding rail.

14. The display device of claim 11, wherein one of the first connecting structure and the second connecting structure is a magnet and another one of the first connecting structure and the second connecting structure is a magnet or a magnetic induction material.

15. The display device of claim 11, wherein at least one of the base and the light guide member has a first positioning structure, the plate has a plurality of second positioning structures, and the first positioning structure is connected to the second positioning structure to position the light source assembly on the plate.

16. The display device of claim 15, wherein one of the first positioning structure and the second positioning structure is an engaging hook and another one of the first positioning structure and the second positioning structure is an engaging hole.

17. The display device of claim 15, wherein one of the first positioning structure and the second positioning structure is a magnet and another one of the first positioning structure and the second positioning structure is a magnet or a magnetic induction material.

18. The display device of claim 11, wherein opposite sides of the plate have two positioning structures, the first connecting structure and the second connecting structure at opposite sides of the light source assembly are connected to the two positioning structures, respectively, such that the light source assembly is positioned on the plate.

19. The display device of claim 18, wherein the positioning structure is a sliding groove.

20. The display device of claim 11, wherein one of the base and the plate has at least one protrusion; when the light source assembly is disposed on the plate, the at least one protrusion abuts against another one of the base and the plate.

* * * * *